(12) United States Patent
Odinak

(10) Patent No.: US 6,419,159 B1
(45) Date of Patent: Jul. 16, 2002

(54) INTEGRATED CIRCUIT DEVICE WITH POWER ANALYSIS PROTECTION CIRCUITRY

(75) Inventor: Gilad Odinak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/332,959

(22) Filed: Jun. 14, 1999

(51) Int. Cl.$^7$ ............................................. G06K 19/06
(52) U.S. Cl. ...................................... 235/492; 713/194
(58) Field of Search ................................. 235/375, 380, 235/382, 382.5, 487, 492; 713/190, 194, 300, 330, 340; 380/46, 255; 708/250

(56) References Cited

U.S. PATENT DOCUMENTS

| | | | |
|---|---|---|---|
| 4,916,333 A | * 4/1990 | Kowalski | 326/68 |
| 4,932,053 A | * 6/1990 | Fruhauf et al. | 235/380 |
| 5,243,648 A | * 9/1993 | Gilardi et al. | 380/252 |
| 5,847,447 A | * 12/1998 | Rozin et al. | 235/451 |
| 5,987,614 A | * 11/1999 | Mitchell et al. | 713/300 |
| 5,995,629 A | * 11/1999 | Reiner | 380/265 |
| 5,998,978 A | * 12/1999 | Connell et al. | 323/273 |
| 6,064,740 A | * 5/2000 | Curiger et al. | 708/265 |
| 6,276,609 B1 | * 8/2001 | Czar et al. | 235/492 |
| 6,278,783 B1 | * 8/2001 | Kocher et al. | 713/340 X |
| 6,298,135 B1 | * 10/2001 | Messerges et al. | 380/1 |
| 6,327,661 B1 | * 12/2001 | Kocher et al. | 713/193 |

FOREIGN PATENT DOCUMENTS

| | | | |
|---|---|---|---|
| EP | 1 115 094 A2 | * | 7/2001 |
| JP | 2000-259799 A | * | 9/2000 |

OTHER PUBLICATIONS

Peter Wayner, "Cryptographers Discuss Finding Of Security Flaw in 'Smart Cards'", www.nytimes.com/library/tech/98/06/cyber/articles/10smartcard.html, pp. 1–6, Jun. 10, 1998.*

* cited by examiner

*Primary Examiner*—Michael G. Lee
*Assistant Examiner*—Jared J. Fureman
(74) *Attorney, Agent, or Firm*—Lee & Hayes, PLLC

(57) ABSTRACT

An integrated circuit (IC) device has a processor and a memory. The IC device is designed to protect a secret, which may be in the form of data stored in the memory (e.g., cryptographic key, a name, confidential data) or special instructions executed by the processor (e.g., confidential instructions). Normal operation of the IC device results in power fluctuations that are externally measurable on the voltage and ground lines. The IC device is equipped with Mower analysis protection circuitry that randomly varies the power fluctuations. In one implementation, the power analysis protection circuitry includes multiple current sinks coupled between the voltage line and the ground line and a random state generator to randomly turn on and off individual ones of the current sinks. The combination of activated current sinks introduces a new set of power fluctuations that have a different frequency, thereby masking the normal power fluctuations.

26 Claims, 2 Drawing Sheets

INTEGRATED CIRCUIT DEVICE WITH POWER ANALYSIS PROTECTION CIRCUITRY

TECHNICAL FIELD

This invention relates to integrated circuits, such as those employed in integrated circuit devices (e.g., smart cards, PC cards, cellular phones, pagers, and the like). More particularly, this invention relates to secure integrated circuits that are designed to prevent exposure of secrets from power analysis attacks.

BACKGROUND

Integrated circuit (IC) chips are ubiquitous today. Some IC chips are designed to protect confidential information or code. For example, smart cards are implemented with secure single-chip integrated circuits that are designed to hold secrets (e.g., cryptographic keys, passcodes, confidential information (financial account numbers), etc.) and to process data using the secrets. Secure chips are specially designed and manufactured to prohibit exposure of secrets as a result of reverse engineering techniques such as deconstructing the chip, layer-by-layer, to extract out data or program code in an effort to discover the secrets.

Differential power analysis is a non-intrusive form of attack on an integrated circuit chip. Rather than carefully peeling apart the circuit, a differential power analysis attack attempts to uncover internal secrets by measuring the power consumed by the chip during execution. The idea is that by knowing what instructions the chip might execute and simultaneously programming an identical chip with such instructions and monitoring power consumption, a person can determine what data is being manipulated by chip execution and thus extract out its secrets. More specifically, power analysis attacks exploit characteristic behaviors of transistor logic gates and software running on today's smart cards and other cryptographic devices. The attacks are performed by monitoring the electrical activity of a device, then using advanced statistical methods to determine secret information (such as secret keys and user PINs) in the device. More information on differential power analysis is provided at the Web site www.cryptography.com.

To mitigate against a power analysis attack, chip manufacturers add mechanisms that prevent execution of certain instructions, or vary the execution time of individual instructions, or smooth power consumption of the chip. However, these mechanisms significantly complicate chip design and manufacturing, making the chip more complex and adding significant cost to the chip.

As another solution, software designers write code with an eye toward making it difficult for a party to extract secrets using power analysis. For instance, software designers ensure that all code executions take the same amount of time, or that the same instructions are performed in different orders. However, this solution is time consuming and results in slower and large code sets. Furthermore, it is hard to evaluate whether the software solutions are effective.

Accordingly, there is a need for a cost-effective approach for protecting IC chips from a power analysis attack.

SUMMARY

This invention concerns an integrated circuit (IC) device that incorporates power analysis protection circuitry to mask the device's normal power consumption. The circuitry randomly varies power fluctuations exhibited by the IC device to reduce any possible correlation between executing code and the data being manipulated by the IC device to thwart any attempt to extract secrets using an external power analysis attack.

In one implementation, the IC device has a processor and a memory. Voltage and ground contacts supply power to the processor and memory. The IC device is designed to protect a secret, which may be in the form of data stored in the memory (e.g., cryptographic key, a name, confidential data) or special instructions executed by the processor (e.g., confidential code instructions).

Normal operation of the integrated circuit device results in power fluctuations that are externally measurable on the voltage and ground lines. The IC device is equipped with power analysis protection circuitry that randomly varies the power fluctuations. The power analysis protection circuitry includes multiple current sinks coupled between the voltage line and the ground line and a random state generator to randomly turn on and off individual ones of the current sinks. The combination of activated current sinks introduces a new set of power fluctuations that have a different frequency, thereby masking the normal power fluctuations. This random variation of the measurable power output renders it very difficult for anyone to extract the secret using a power analysis attack.

BRIEF DESCRIPTION OF THE DRAWINGS

The same numbers are used throughout the drawings to reference like elements and features.

DETAILED DESCRIPTION

Figure 1:
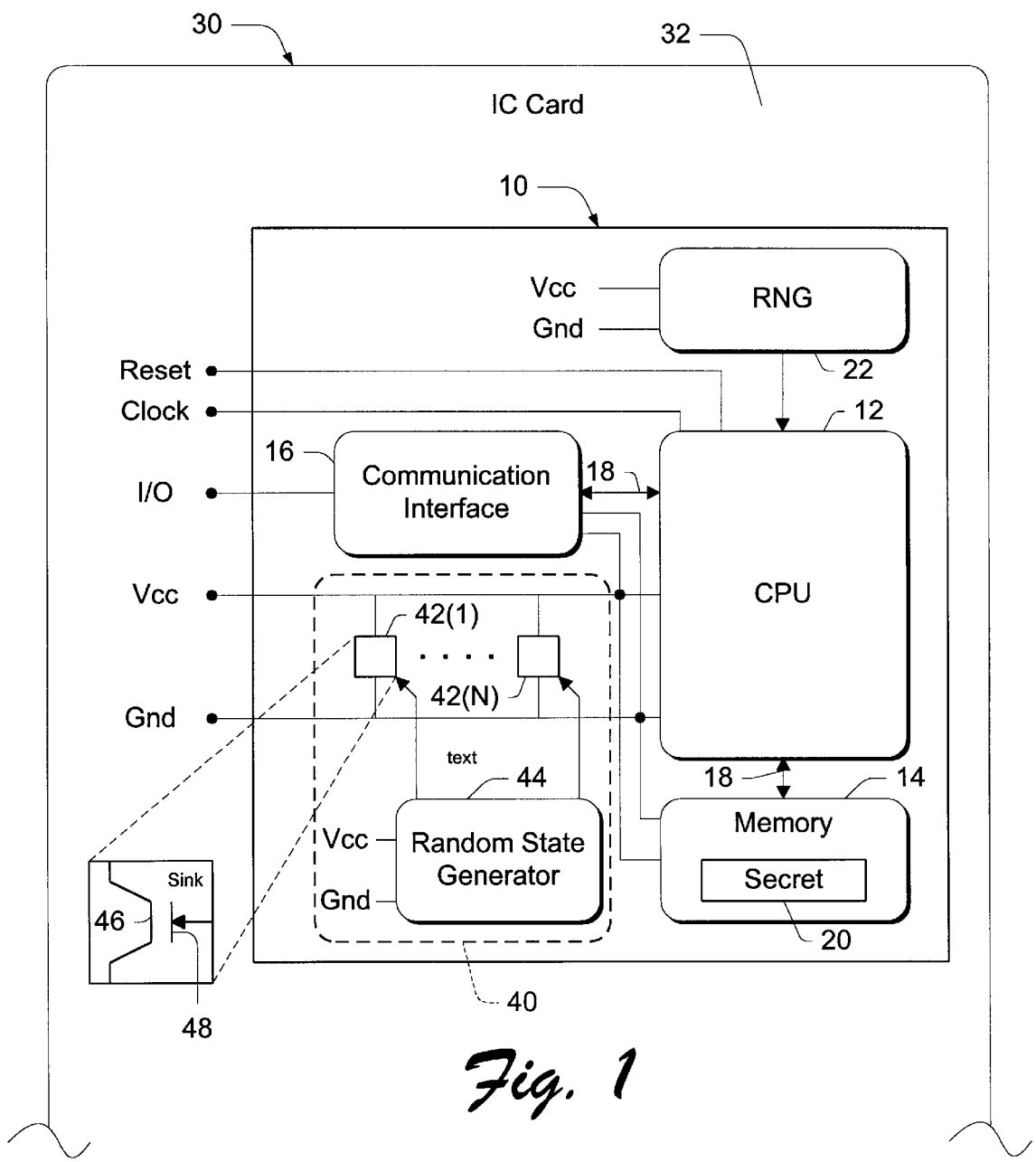
FIG. 1 is a block diagram of an integrated circuit chip having power analysis protection circuitry.

FIG. 1 shows a power analysis protection device 10 implemented as an integrated circuit. The device 10 has a processor or CPU (central processing unit) 12, a memory 14, and a communications interface 16. A multi-bit bus structure 18 interconnects the CPU 12, memory 14, and interface 16. The memory 14 includes both volatile and persistent memory and is representative of many different memory types including, for example, volatile RAM (Random Access Memory), ROM (Read Only Memory), EEPROM (Electrically Erasable Programmable ROM), and flash memory.

The memory 14 stores a secret 20. The memory 14 may be partitioned into a public portion and a private portion, wherein access to the private portion is governed by special protocols designed to keep the stored information confidential. The secret 20 may be stored in the private portion of the memory 14.

There are many different types of secrets that may be kept by the device. For instance, the secret may be one or more cryptographic keys (e.g., encryption key, decryption key, signing key, etc.). It may also be a passcode, a name, or a certificate. Another example of a secret may be something of value, such as electronic assets or financial account numbers. The secret ma e data or protocols used to access information stored somewhere other than on the device. Another example of a secret may be a set of code instructions that an executed on the processor.

The device 10 has a number of contacts to receive power and data from external sources. Data is transferred to and from the device 10 via an I/O (input/output) contact connected to the communications interface 16. The device 10 receives power at a voltage contact (Vcc) and a ground contact (Gnd). A clock signal and a reset signal are received at a clock contact and a reset contact.

The device 10 is capable of performing functions using the secret 20. As one example, the device performs cryptographic functions using a secret key. To perform cryptographic functions, the device 10 is equipped with a random number generator (RNG) 22.

As described thus far, the integrated circuit device 10 is representative of conventional IC circuitry. In the illustrated implementation, the IC device 10 is representative of a microcontroller circuit of an integrated circuit card 30, such as a smart card. A smart card 30 has a single wafer integrated circuit 10 mounted on an otherwise plastic card 32. The smart card is physically constructed in accordance with the international standard ISO-7816 that governs size and bendable limits of the plastic card, as well as size and location of the silicon integrated circuit. Alternatively, the IC card might be in the form factor of a PCMCIA card (i.e., a PC card) or a floppy diskette, with one or more processing chips configured thereon.

As noted in the Background, IC devices (such as a microcontroller circuit on a smart card) can be subjected to a differential power analysis attack. During such an attack, a party attempts to learn the secret 20 by externally monitoring the power lines Vcc and Gnd for power fluctuations that occur during execution of the CPU 12 while it is utilizing the secret 20.

To thwart differential power analysis attacks, the IC device 10 is equipped with power analysis protection circuitry 40 coupled to the power lines Vcc and Gnd to mask power consumption differences measurable on these power lines as a result of processor execution. When the processor executes code, it causes power fluctuations on the power lines Vcc and Gnd. The power analysis protection circuitry 40 randomly varies the power fluctuations to disguise the actual results of program execution to thereby protect against extraction of the secret 20.

In the illustrated implementation, the power analysis protection circuitry 40 has multiple current sinks 42(1), . . . , 42(N) coupled to the power contacts Vcc and Gnd. The power analysis protection circuitry 40 also has a random state generator 44 to randomly turn on and off any combination of individual ones of the current sinks to vary the power fluctuations measurable on the power lines Vcc and Gnd.

As one exemplary implementation, each current sink 42 is implemented as a transistor (e.g., CMOS) having a source-to-drain path 46 connected between the voltage contact Vcc and the ground contact Gnd. The transistor 42 also has a gate 48 connected to the random state generator 44. The random state generator 44 randomly turns on/off the transistors to allow conductance in the source-to-drain paths 46.

The random state generator 44 is implemented, for example, as a random number generator similar or identical to the RNG 22. During chip manufacturing, two RNG circuits can be easily built on the chip: one for the cryptographic functions and one for power analysis protection. The addition of one RNG circuit and a few transistors does not significantly impact chip construction or cost.

The two RNG circuits 22 and 44 are preferably not correlated with one another. If the two are correlated, a party may be able to learn about the characteristics of the random state generator 44 from the RNG 22. It is typical in smart card implementations for the RNG 22 to be driven by and synchronized with the external clock signal common to the chip. If the same clock drives both RNG circuits, the circuits will be correlated. Newer smart card technologies incorporate a separate on-chip clock (not shown) that operates at a higher frequency than the external clock. The two different clock signals can be used as inputs to the two RNG circuits, thereby decoupling any correlation that might otherwise be derived from use of a single clock source.

Another approach to ensuring that the RNG circuits 22 and 44 are not correlated is to vary the operating conditions that typically (and purposely) make them unstable (e.g., sensitivity to voltage supply and temperature variations). For instance, the RNG circuits may be spaced apart from each other on the chip so that such variables affect the circuits differently. Another technique is to supply power from different points in the chip. Another possible implementation is to utilize voltage and/or temperature regulation circuitry for one RNG, but not the other.

The current sinks 42(1)–42(N) consume power at different rates. Suppose, for example, that execution of two instructions x and y by the processor results in a power fluctuation of $\Delta I_{Inst(x,y)}$ on the Vcc and Gnd lines. Now, suppose the first current sink 42(1) consumes $\Delta I_{sink(1)}$, which is preferably less than the smallest power consumption between any two instructions $\Delta I_{Inst(x,y)}$. The next current sink 42(2) consumes K times more power than the previous current sink (i.e., $\Delta I_{sink(2)} = K\Delta I_{sink(1)}$). The power consumption for any given current sink $\Delta I_{sink(i)}$ is generally described as follows:

$$\Delta I_{sink(i)} = K^{i-1}\Delta I_{sink(i-1)} \text{ for } i=2, \ldots, N.$$

The value K is preferably a constant (e.g., K=2). The last current sink 42(N) consumes $K^{N-1}$ times more power than the first current sink 42(1). The last current sink preferably consumes more than the largest power consumption difference between any two instructions $\Delta I_{Inst(x,y)}$.

When the random state generator 44 turns on one or more current sinks 42(1)–42(N), the power analysis protection circuitry 40 effectively introduces a cumulative power fluctuation of $\Delta I_{PAPC}$ across the power contacts Vcc and Gnd. That is, $$\Delta I_{PAPC} = \Delta I_{sink(1)} + \Delta I_{sink(2)} + \ldots + \Delta I_{sink(N)}.$$

The additional power fluctuation $\Delta I_{PAPC}$ is added to the normal power fluctuation $\Delta I_{Inst(x,y)}$ resulting from execution of two code instructions x and y by the processor. According to one implementation, the average added power consumption $\Delta I_{PAPC}$ introduced by the power analysis protection Circuitry 40 is approximately equal to the normal power consumption $\Delta I_{Inst(x,y)}$. But, at any one time, the added power consumption $\Delta I_{PAPC}$ introduced by the power analysis protection circuitry 40 ranges from less than $\Delta I_{Inst(x,y)}$ to greater than $\Delta I_{Inst(x,y)}$.

According to one implementation, the power analysis protection circuitry 40 varies its power consumption at a period that is less than or equal to the period of power fluctuations resulting from normal processor execution of the instructions. The combination of (1) changing the measurable power output of an integrated circuit chip by random amounts and (2) changing it at a frequency that does not coincide with normal instruction execution makes it very difficult to discern what instructions are being executed using a differential power analysis attack. This, in turn, renders it very difficult to extract the secret 20 maintained in the device 10.

Figure 2:
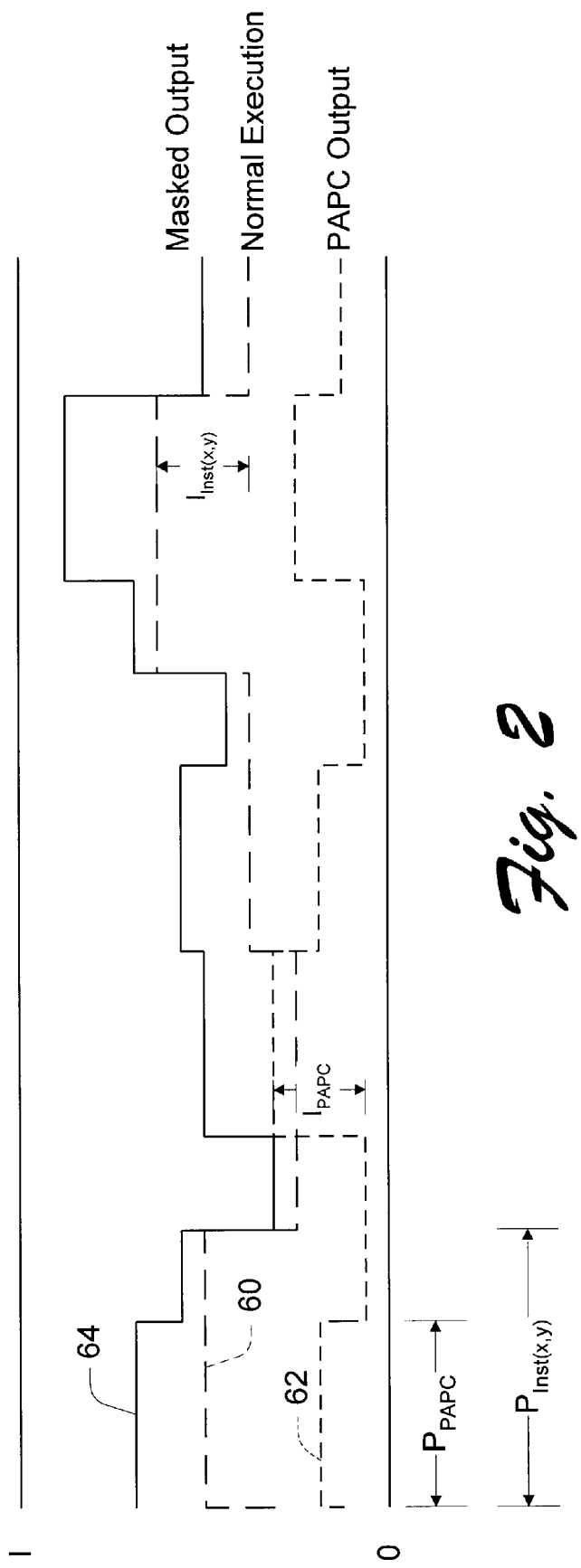
FIG. 2 is a signal diagram illustrating masked power consumption by the integrated circuit chip.

FIG. 2 shows a signal diagram illustrating power consumption as a result of normal operation and the added power consumption randomly introduced as a result of the power analysis protection circuitry. The signal diagram shows currents ranging from no current to current I. A first current signal 60 reflects the normal power fluctuation resulting from processor execution of code instructions. An exemplary current change resulting from execution of two instructions is given as $\Delta I_{Inst(x,y)}$. A second current signal 62 reflects the power consumption introduced by the power analysis protection circuitry 40. An exemplary fluctuation of $\Delta I_{PAPC}$ resulting from operation of the power analysis protection circuitry is illustrated.

Notice that the second current signal 62 produced by the power analysis protection circuitry 40 has a period $P_{PAPC}$. This period is less than a period $P_{Instruction}$ for the normal current signal 60. Preferably, period $P_{PAPC}$ is less than or equal to period $P_{Instruction}$.

The two current signals 60 and 62 combine to create a masked output signal 64 that is measurable across the Vcc and Gnd contacts. An external power analysis attack on the chip would detect the power fluctuations exhibited by the combined masked signal 64, rather than the fluctuations associated with the normal signal 60. The masked signal does not provide any clues as to the instructions being performed or the secret 20 being used during processor execution.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A device comprising:
    a processor;
    power lines coupled to deliver power to the processor;
    power analysis protection circuitry coupled to the power lines to mask power consumption differences measurable on the power lines as a result of processor execution to thereby protect against a differential power analysis attack, the power consumption being masked at times that are not dependent on when power is actually consumed by processor execution, the power analysis protection circuitry comprising:
        multiple current sinks coupled to the power lines; and
        a random state generator to randomly turn on and off any combination of individual ones of the current sinks to thereby vary power fluctuations measurable on the power lines.

2. A device as recited in claim 1, wherein the processor utilizes a secret during execution and the power analysis protection circuitry varies the power consumption to prevent exposure of the secret.

3. A device as recited in claim 1, wherein execution of the processor results in power fluctuations on the power lines that have a first period and the power analysis protection circuitry causes additional power fluctuations on the power lines of a second period that is less than or equal to the first period.

4. A device as recited in claim 1, wherein execution of the processor between two instructions x and y results in a power fluctuation of $\Delta I_{Inst(x,y)}$ on the power lines and the power analysis protection circuitry causes an additional power fluctuation of $\Delta I_{PAPC}$ on the power lines, wherein $\Delta I_{PAPC}$ is approximately equal to $\Delta I_{Inst(x,y)}$.

5. A device as recited in claim 1, wherein execution of the processor between two instructions x and y results in a power fluctuation of $\Delta I_{Inst(x,y)}$ on the power lines and the power analysis protection circuitry causes an additional power fluctuation of $\Delta I_{PAPC}$ on the power lines, wherein $\Delta I_{PAPC}$ ranges from less than $\Delta I_{Inst(x,y)}$ to greater than $\Delta I_{Inst(x,y)}$.

6. A device as recited in claim 1, wherein each of the current sinks comprises a transistor having a source to drain path connected between the power lines and a gate connected to the random state generator.

7. A device as recited in claim 1, wherein the current sinks consume power at different rates.

8. A smart card comprising the device as recited in claim 1.

9. An integrated circuit comprising:
    a memory to store a secret;
    a processor coupled to the memory to process data using the secret;
    a voltage line to supply voltage to the memory and the processor;
    a ground line to provide ground to the memory and the processor;
    multiple current sinks coupled between the voltage line and the ground line, the current sinks being configured to consume power at different rates such that for N current sinks with a first current sink consuming $\Delta I_{sink (1)}$, the current sinks consume power at:

$$\Delta I_{sink} = K^{i-1} \Delta I_{sink}(i-1) \text{ for } i=2, \ldots, N; \text{ and}$$

a random state generator to randomly turn on and off individual ones of the current sinks to thereby vary power fluctuations measurable on the voltage and ground lines to prevent extraction of the secret through power analysis.

10. An integrated circuit as recited in claim 9, wherein the secret is a key used for cryptographic functions.

11. An integrated circuit as recited in claim 9, wherein execution by the processor results in power fluctuations on the power lines that have a first period and the random state generator turns on and off the current sinks at a frequency having a second period that is less than or equal to the first period.

12. An integrated circuit as recited in claim 9, wherein execution by the processor between two instructions x and y results in a power fluctuation described by $\Delta I_{Inst(x,y)}$ and the current sinks, when individually turned on by the random state generator, cause an additional power fluctuation of $\Delta I_{added}$ that is approximately equal to $\Delta I_{Inst(x,y)}$.

13. An integrated circuit as recited in claim 9, wherein execution by the processor between two instructions x and y results in a power fluctuation described by $\Delta I_{Inst(x,y)}$ and the current sinks, when individually turned on by the random state generator, cause an additional power fluctuation of $\Delta I_{added}$ that ranges from less than $\Delta I_{Inst(x,y)}$ to greater than $\Delta I_{Inst(x,y)}$.

14. An integrated circuit as recited in claim 9, wherein each of the current sinks comprises a transistor having a source to drain path connected between the voltage line and the ground line and a gate connected to the random state generator.

15. An integrated circuit as recited in claim 9, wherein the current sinks consume power at different rates.

16. A smart card comprising the integrated circuit as recited in claim 9.

17. A smart card with a microcontroller and a power/ground interface to transport power to the microcontroller, the smart card comprising:

power analysis protection circuitry coupled to the power/ground interface to randomly vary power fluctuations exhibited by the smart card as a result of microcontroller operation, and multiple current sinks coupled to the power/ground interfaces, the current sinks being configured to consume power at different rates such that for N current sinks with a first current sink consuming $\Delta I_{sink(1)}$ the current sinks consume power at:

$$\Delta I_{sink(i)} = K^{i-1} \Delta I_{sink(i-1)} \text{ for } i=2, \ldots, N.$$

18. A smart card as recited in claim 17, wherein execution by the microcontroller results in power fluctuations on the power/ground, interface that have a first period and the power analysis protection circuitry causes additional power fluctuations on the power/ground interface of a second period that is less than or equal to the first period.

19. A smart card as recited in claim 17, wherein execution by the microcontroller of two instructions x and y results in a power fluctuation described by $\Delta I_{Inst(x,y)}$ and the power analysis protection circuitry causes an additional power fluctuation of $\Delta I_{PAPC}$ on the power/ground interface, wherein $\Delta I_{PAPC}$ is approximately equal to $\Delta I_{Inst(x,y)}$.

20. A smart card as recited in claim 17, wherein execution by the microcontroller of two instructions x and y results in a power fluctuation described by $\Delta I_{Inst(x,y)}$ and the power analysis protection circuitry causes an additional power fluctuation of $\Delta I_{PAPC}$ on the power/ground interface, wherein $\Delta I_{PAPC}$ ranges from less than $\Delta I_{Inst(x,y)}$ to greater than $\Delta I_{Inst(x,y)}$.

21. A smart card as recited in claim 17, wherein the power analysis protection circuitry further comprises:

a random state generator to randomly turn on and off individual ones of the current sinks to thereby vary the power fluctuations measurable on the power/ground interface.

22. A smart card as recited in claim 21, wherein the current sinks consume power at different rates.

23. A method for preventing discovery of a secret through differential power analysis of power fluctuations that occur during execution of an integrated circuit, the integrated circuit consuming power at a particular instant in response to an execution of an operation, the method comprising:

generating random power changes, the random power changes being generated in a manner that is not dependent on when power is actually consumed by the integrated circuit in response to the execution of the operation; and adjusting the power fluctuations measurable on power lines of the integrated circuit with the random power changes by randomly turning on and off any combination of individual current sinks coupled to the power lines.

24. A method as recited in claim 23, wherein the power fluctuations have a first period and the adjusting comprises modifying the random power changes at a second period that is less than or equal to the first period.

25. A method as recited in claim 23, wherein execution of the integrated circuit between two instructions x and y results in a power fluctuation described by $\Delta I_{Inst(x,y)}$ and the generating comprises producing a random power change of $\Delta I_{random}$ that is approximately equal to $\Delta I_{Inst(x,y)}$.

26. A method as recited in claim 23, wherein execution of the integrated circuit between two instructions x and y results in a power fluctuation described by $\Delta I_{Inst(x,y)}$ and the generating comprises producing a random power change of $\Delta I_{random}$ that ranges from less than $\Delta I_{Inst(x,y)}$ to greater than $\Delta I_{Inst(x,y)}$.

* * * * *

UNITED STATES PATENT AND TRADEMARK OFFICE
CERTIFICATE OF CORRECTION

PATENT NO. : 6,419,159 B1
DATED : July 16, 2002
INVENTOR(S) : Odinak

It is certified that error appears in the above-identified patent and that said Letters Patent is hereby corrected as shown below:

<u>Title page,</u>
Item [57], ABSTRACT,
Line 1, add -- A voltage and ground line supply power to the memory and the processor. --.
Line 9, replace "Mower" with -- power --.
After the last sentence, add -- This random variation of the measurable power output renders it very difficult for anyone to extract the secret using a differential power analysis attack. --.

<u>Column 2,</u>
Line 61, replace "ma e" with -- may further be --.
Line 64, replace "an" with -- are --.

<u>Column 4,</u>
Line 49, replace "Circuitry" with -- circuitry --.

Signed and Sealed this

Twelfth Day of November, 2002

*Attest:*

JAMES E. ROGAN
*Director of the United States Patent and Trademark Office*

*Attesting Officer*